(12) United States Patent
Koetke

(10) Patent No.: US 7,300,273 B2
(45) Date of Patent: Nov. 27, 2007

(54) SYSTEM FOR FORMING A HOLLOW BODY

(75) Inventor: Claus-Dieter Koetke, Bad Bodenteich (DE)

(73) Assignee: Thermo-Technik-Systeme GmbH, Luder/Reinstorf (DE)

(*) Notice: Subject to any disclaimer, the term of this patent is extended or adjusted under 35 U.S.C. 154(b) by 360 days.

(21) Appl. No.: 11/134,499

(22) Filed: May 23, 2005

(65) Prior Publication Data
US 2006/0008552 A1    Jan. 12, 2006

(30) Foreign Application Priority Data
Jul. 8, 2004    (DE)    ............ 10 2004 033 131

(51) Int. Cl.
  *B29C 49/02*    (2006.01)
  *B29C 49/30*    (2006.01)
  *B29C 49/56*    (2006.01)

(52) U.S. Cl. .............. 425/532; 425/534; 425/538; 425/541

(58) Field of Classification Search ........... 425/532, 425/534, 538, 541
See application file for complete search history.

(56) References Cited

U.S. PATENT DOCUMENTS 4,026,983 A * 5/1977 Stockwell ............ 264/531
4,738,612 A * 4/1988 Kikuchi et al. ............ 425/532
5,030,083 A 7/1991 Kohno et al.
5,264,178 A * 11/1993 Yamamura et al. ......... 425/532
5,288,224 A * 2/1994 Yamamura et al. ......... 425/532
5,403,175 A 4/1995 Stroh
5,662,842 A * 9/1997 Sadr et al. ................. 425/532

FOREIGN PATENT DOCUMENTS

EP    0185 110 A    6/1986
EP    0 256 442 A   2/1988
EP    1 110 698 A   11/2001

* cited by examiner

*Primary Examiner*—Robert B. Davis
(74) *Attorney, Agent, or Firm*—Edell, Shapiro & Finnan LLC

(57) ABSTRACT

A system for forming a hollow body may include at least one closing unit positioned beneath the die of a tube extrusion device. The closing unit may include a first vertical closing plate and second vertical closing plate. Specifically, an upper horizontal closing plate is cantilevered to the first vertical closing plate carrying an upper mold half, while a lower horizontal supporting plate is cantilevered to the second vertical closing plate carrying a lower mold half. At least one hydraulic cylinder may connect to the horizontal supporting plate and be adapted to vertically displace the lower horizontal closing plate. The closing unit is configured in such a way that when the vertical closing plates are moved toward each other, the upper horizontal closing plate and the lower horizontal supporting plate interlock. The system can be configured to produce oblong hollow bodies requiring a horizontal mold parting plane.

12 Claims, 7 Drawing Sheets a)

b)

c)

d)

SYSTEM FOR FORMING A HOLLOW BODY

RELATED APPLICATION

This application claims priority under 35 U.S.C. § 119 to German Patent Application No. 10 2004 033 131.6, entitled *A Hollow Body Blowing System* and filed on Jul. 8, 2004, the contents of which are incorporated herein by reference in their entirety.

FIELD OF THE INVENTION

This invention relates to a system for forming hollow bodies, in particular, a blow molding system that can be configured as a vertical or a horizontal system.

BACKGROUND

Blow molding systems generally fall into two categories. The first type of system includes a vertical mold parting plane (called a vertical system). The second type includes a horizontal mold parting plane (called a horizontal system). Systems for forming a hollow body including mold halves fastened to the closing plates and vertical mold parting planes are often used to produce plastic bottles and technical molded parts such as parts having an oblong shape with open ends (e.g., air guide conduits). The length of the parts that can be produced by such systems, however, is limited by various parameters including the weight of the extruded tube (which increases with increasing tube length), the type of the plastic materials forming the tube, and the diameter of the tube, the wall thickness, and other parameters. In particular, such systems are not suitable for producing seamless, oblong pipes, conduits, and similar hollow bodies whose longitudinal axes include sharp and/or multiple bends.

For these reasons, seamless parts are often formed using a horizontal system for forming a hollow body. For example, U.S. Pat. No. 5,030,083 to Kohno et al. shows a system including a tube extrusion device with a robot that receives a tube extruded in a suspended manner from a die and then places the tube in a cavity positioned on a lower horizontal molding portion, which, in turn, is situated on a lower closing plate. In operation the molding portion and the closing plate are moved horizontally to a closing unit, where the mold is closed by lowering an upper horizontal closing plate that carries an upper molding portion. A second carriage is connected to a carriage carrying the lower closing plate. The second carriage carries a second lower closing plate and thereon a second lower molding portion, which are moved in tandem with the first lower molding portion and its associated second closing unit. The first and second molding portions are alternately positioned under the die and their respective closing unit. Although a horizontal system forms seamless, oblong molded parts of varying geometries, it is less economical than vertical systems for producing plastic hollow bodies of large diameters (i.e., large diameters with respect to their lengths).

The present invention is directed to a vertical system for forming a hollow body. The system comprises a machine frame with a tube extrusion device and at least one closing unit including first and second vertical closing plates situated below the die of the extrusion device. The vertical plates are guided in opposite directions against one another such that they can be moved away from and toward one another on horizontal posts. The posts may be mounted on a carriage. The carriage can move the closing unit at a right angle to the direction of movement of the vertical closing plates, from a position under the tube extrusion die to a position under a blowing sleeve.

OBJECTS AND SUMMARY

An object of the present invention is to extend the field of application of a hollow body, blow-molding system with a vertical mold parting plane (also called a vertical mold partition) by providing a vertical system capable of performing as both a vertical or horizontal system.

This and other objects may be achieved using a system for forming a hollow body system in accordance with the invention. Generally, the embodiments of the present invention provide a blow molding system including a first vertical closing plate with an upper horizontal closing plate cantilevered thereto. The upper horizontal closing plate carries an upper mold half on its lower side. Similarly, a lower horizontal supporting plate can be cantilevered to the lower region of the second vertical closing plate. At least one hydraulic cylinder is connected to the lower horizontal supporting plate through a lower horizontal closing plate, and is configured to vertically displace the lower horizontal supporting plate. A lower mold half may be positioned on the upper side of the lower horizontal closing plate. In operation, when the vertical closing plates move toward each other, the edges of the upper horizontal closing plate and the lower horizontal closing plate interlock with the vertical closing plates.

The present invention reconfigures a hollow body blow molding system with vertical mold parting planes in such a way that it can also be used for producing oblong hollow bodies (which require a horizontal mold parting plane). As a result, the system of the current invention can also be configured to operate as a horizontal system. The hollow body mold-blowing system can be reconfigured depending on the type of hollow body sought to be produced (i.e., a hollow body requiring molds with a vertical mold parting plane or a horizontal mold parting plane). One can thus omit purchasing a second blowing system which is designed exclusively for molds with a horizontal mold parting plane.

The interlocking engagement between the upper horizontal closing plate and the second vertical closing plate and between the lower horizontal supporting plate and the first vertical closing plate can be achieved by pillaring the respective plates on guide bolts and complementary guide sleeves.

The lower horizontal closing plate is preferably guided by two guide posts and driven by a single hydraulic cylinder situated centrally under the lower horizontal closing plate.

The system can also comprise a tube insertion robot that receives an extruded tube (also called a preform) from the die and places the tube into the cavity of the lower blow mold half. The robot may include a single gripper operable to grasp the upper end of the tube. Alternatively, the robot can also be provided with two grippers, one configured to grasp the upper tube end the other configured to grasp the lower tube end.

In accordance with the further development of the invention, the tube insertion robot can also comprise squeeze pliers adapted to seal the upper tube end when removing the tube from the die. This prevents air, which can be injected during the extrusion of the tube to provide support, from escaping the tube and causing the tube to collapse during or after its insertion into the lower blow mold half.

When using a tube robot with only one gripper configured as squeeze pliers, the lower tube end can be sealed either by a second pair of squeeze pliers or by at least one clamping apparatus positioned along the lower mold half.

In order to form the tube in the closed blow mold into the finished hollow body, a blowing apparatus can be arranged on one of the mold halves. Preferably the blowing apparatus is positioned on the lower mold half.

The blowing apparatus may comprise a hollow needle connected to a blowing air source that can be inserted into the tube.

Alternatively, the blowing apparatus may comprise a blowing sleeve that calibrates and shapes one of the tube ends of the finished hollow body into an orifice or opening. The blowing sleeve can also be fixed to one of the mold halves (preferably the lower mold half).

According to another embodiment of the present invention, the blowing sleeve can be adapted to move such that it ejects the finished hollow body from the blow mold when it is opened. Optionally, known auxiliary apparatuses such as vacuum suction or grippers may be used in place of or in addition to the blow sleeve in order to remove the finished hollow body.

A preferred embodiment of the present invention may include a second, movable closing unit comprising the same configuration as the first closing unit. The second closing unit can be alternated with the first closing unit to be positioned under the tube extrusion die. The two closing units moved in tandem in a reciprocating fashion from one position under the die, where the tube is placed into the lower mold half, to another position on the one or the other side of the die, where the tube is blown into the finished hollow body, cooled, and ejected from the mold halves.

Preferably, the tube extrusion device is adapted to raise and lower. When using the system in conjunction with molds having a vertical mold parting plane (i.e. mold for producing tube elements or containers which are short with respect to their diameter), the die is situated in its lowermost position. When using the system with molds having a horizontal mold parting plane, the height of the die orifice depends on the length of the tube or preform to be extruded (i.e., of the length of the oblong hollow body to be produced).

In addition, the orientation of the tube extrusion device can be selectively positioned horizontal to or parallel to the direction of movement of the closing plates.

BRIEF DESCRIPTION OF THE DRAWINGS

Like reference numerals have been used to identify like elements throughout this disclosure.

DETAILED DESCRIPTION

Figure 1:
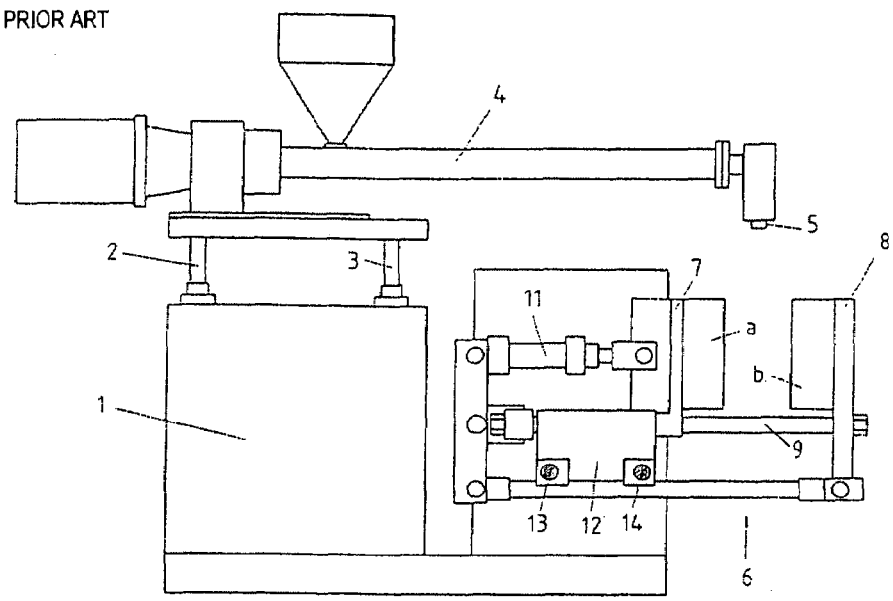
FIG. 1 illustrates a side view of a blowing system including a vertical mold parting plane.
Figure 2:
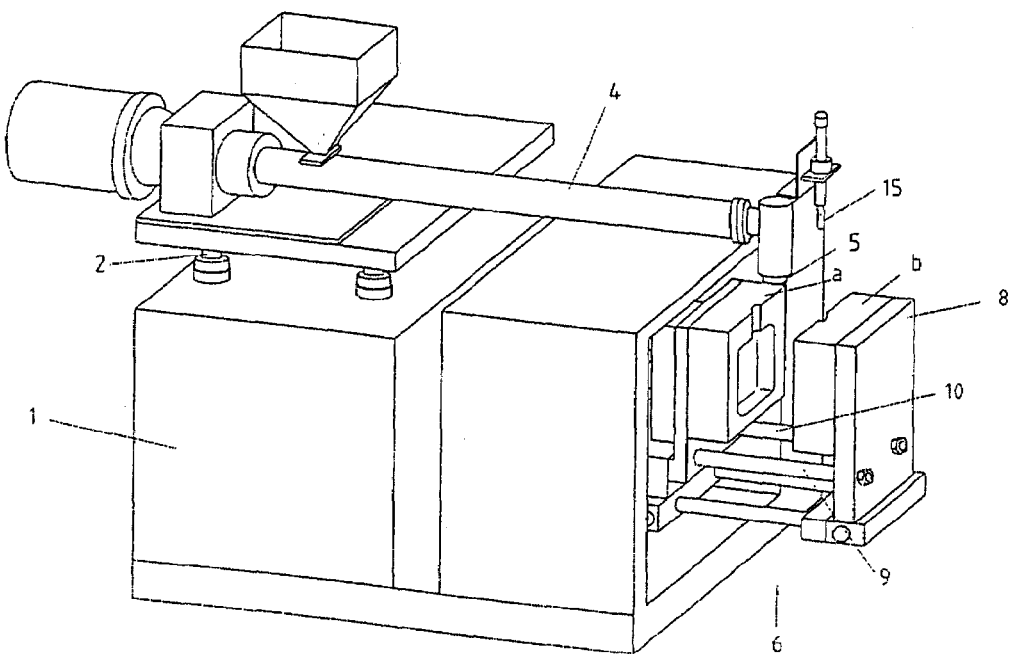
FIG. 2 illustrates a perspective view of the system of FIG. 1.
Figure 3:
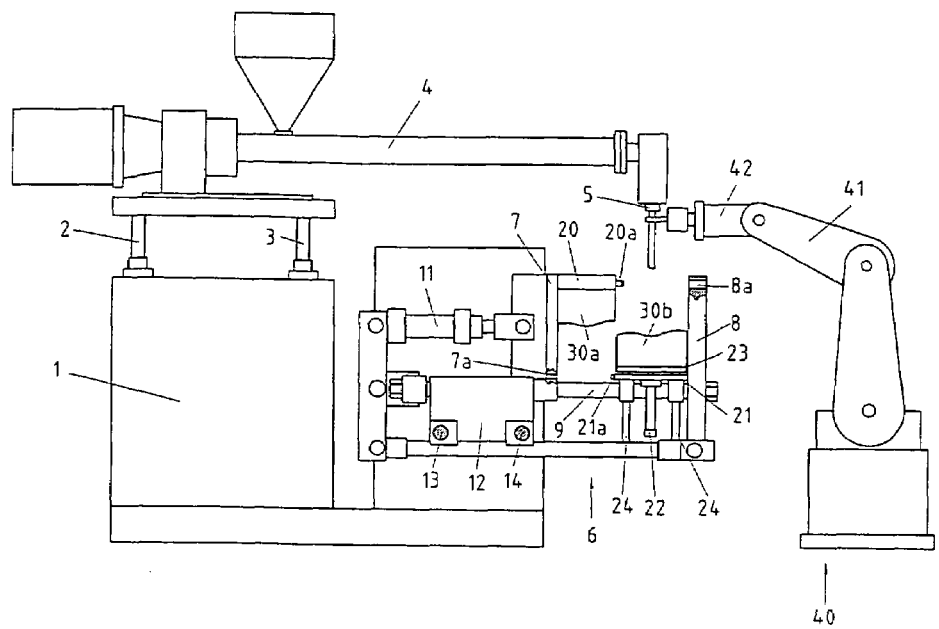
FIG. 3 illustrates a side view of the blowing system according to an embodiment of the invention, showing a system including a horizontal mold parting plane.
Figure 4:
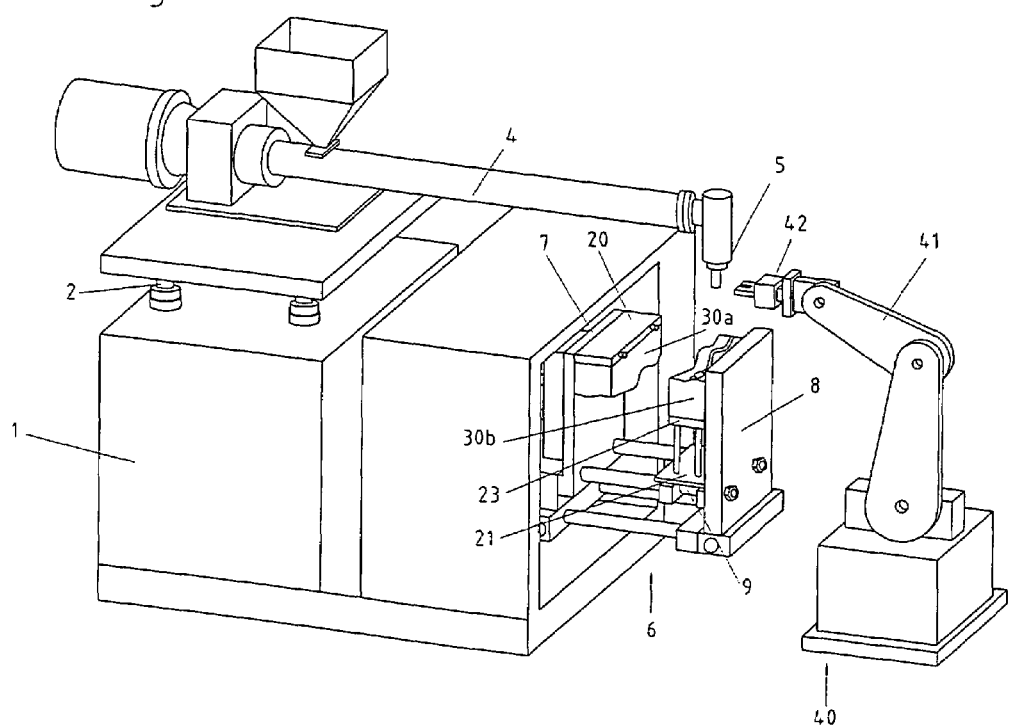
FIG. 4 illustrates a perspective view of the system of FIG. 3, showing the lower blow mold half in the insertion position.
Figure 5:
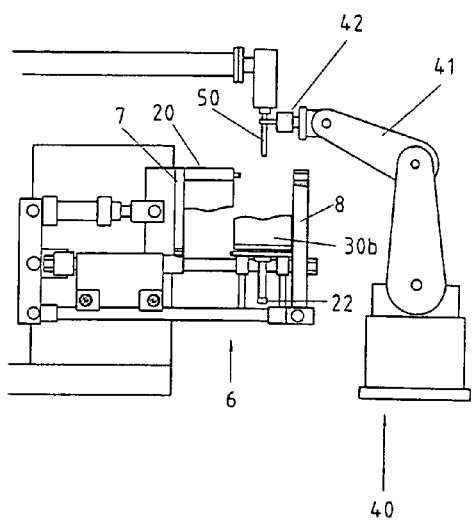
FIGS. 5a-d illustrate the sequence of a working cycle of the system of FIGS. 3 and 4.
Figure 5:
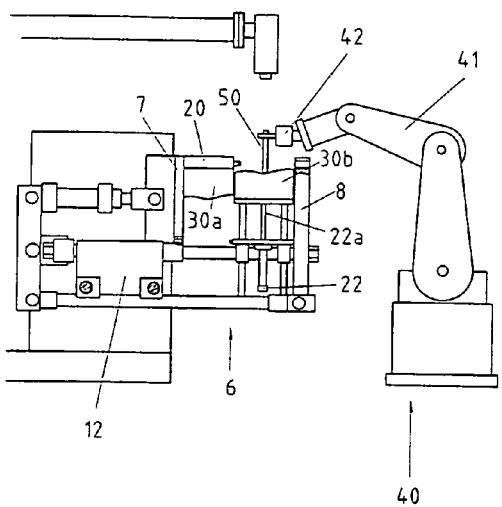
Figure 5:
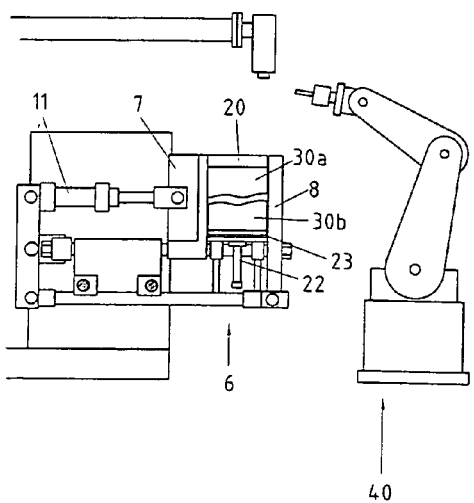
Figure 5:
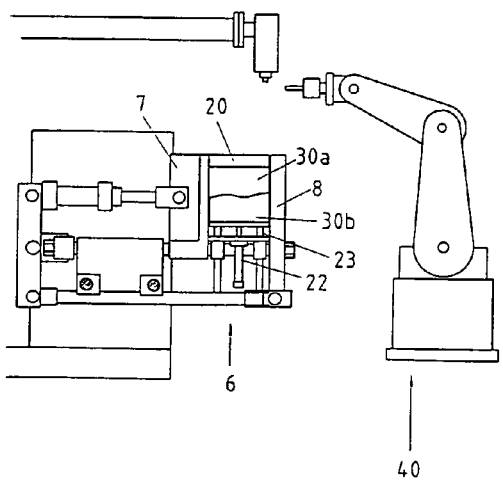

FIGS. 1 and 2 illustrate a conventional hollow body blowing system with vertical mold parting partition. As shown, the system includes a machine frame 1, on which is situated a tube extrusion device 4 with a die 5. The extrusion device can be raised and lowered hydraulically, or by using spindles 2, 3. A closing unit 6, situated below the die, comprises a first or inner closing plate 7 and a second or outer closing plate 8. A hydraulic cylinder 11 can move the closing plates 7, 8 toward and away from each other along horizontal posts 9, 10. The posts 9, 10 and the cylinder 11 are mounted on a carriage 12 driven by a carriage cylinder (not shown) along two posts 13, 14 at a right angle to the movement of the closing plates 7, 8, from a position beneath the die 5 to a position under a conventional blowing sleeve 15. A first blow mold half a is fastened with the first closing plate 7, and a second blow mold half b is fastened to the second closing plate 8. After the extruding, a tube or preform of suitable length from the die 5 into the opened mold halves a, b, the mold is closed by the hydraulic cylinder 11. The closing unit 6 is then moved transversely by the carriage 12 from its position beneath the die 5 to a position beneath the blowing sleeve 15. After blowing out the hollow body and allowing the body to cool, the hydraulic cylinder 11 opens the mold and the hollow body (e.g., a product such as a handle bottle as shown in the cavity of FIG. 2) in the mold half a is ejected. FIGS. 1 and 2 do not illustrate the known auxiliary devices such as those for changing the wall thickness of the tube and for severing the tube beneath the tube and the hydraulic and cooling water connections.

FIGS. 3 to 7 further illustrate a system for producing hollow bodies in accordance with the present invention including a horizontal blow mold, i.e., with horizontal mold parting plane. In this system, after the removal of the blow mold halves a, b (seen in FIGS. 1 and 2), an upper horizontal closing plate 20 is mounted on the upper region of the first inner closing plate 7 (e.g., by means of screws and alignment pins) such that it is cantilevered. Similarly, to the lower region of the second outer closing plate 8, a horizontal supporting plate 21 is fastened in a cantilevered manner. The upper horizontal closing plate 20 comprises guide pins 20a at its outer edge facing the vertical closing plate 8 and the vertical outer closing plate 8 is provided with corresponding guide bushings 8a. Similarly, the horizontal supporting plate 21 comprises guide pins 21a and the vertical inner closing plate 7 comprises guide bushings 7a. A hydraulic cylinder 22 is fastened beneath the supporting plate 21 proximate the supporting plate center. A piston rod 22a penetrates the supporting plate 21, terminating beneath a lower horizontal closing plate 23 positioned using guide posts 24. With this configuration, the hydraulic cylinder 22 may raise and lower the supporting plate 21.

An upper mold half 30a is fastened to the lower side of the upper horizontal closing plate 20. A corresponding lower mold half 30b is screwed onto the upper side of the lower horizontal closing plate 23. The parts 20, 21, 23 are dimensioned to enable their contact. Specifically, their width is dimensioned in the direction of movement of the vertical closing plates 7, 8 such that the lower mold half 30b can be brought into the position shown in FIG. 4 by the hydraulic cylinder 22 (at least at the maximum opened position of the vertical closing plates 7, 8), where it is situated adjacent to the upper mold half 30a. If required, the guide pins 20a, 21a can be received in their plates in an extendable and retractable manner.

Referring to FIG. 5a, a tube robot 40 receives the tube 50 from the die 5 by means of a gripper positioned at the end of a robot arm 41. The gripper may be configured as squeeze pliers 42 with a pair of moveable pincers. In the meantime, the hydraulic cylinder 22 lifts the lower blow mold half 30b to the insertion position (shown in FIG. 5b). Preferably the lower blow mold half 30b is at the same height relative to the upper mold half 30a so that the outer vertical closing plate does not obstruct the insertion movement of the robot arm 41.

The lower mold half 30b, moreover, may be supported by the closing unit 6, which can be selectively displaced by a carriage 12. After the insertion of the tube 50 into the cavity of the lower mold half 30b, the hydraulic cylinder 22 lowers the lower mold half 30b again. The hydraulic cylinder 11 may then move the vertical closing plates 7, 8 to the position illustrated in FIG. 5c, where the upper horizontal closing plate 20 and the lower horizontal supporting plate 21 are positioned between the vertical closing plates 7, 8. Thereafter the hydraulic cylinder 22 lifts the lower mold half 30b until it rests on the upper mold half 30a (FIG. 5d), closing the mold. The tube is blown into the finished hollow body. After the finished hollow body cools and is ejected from the mold, the next cycle starts.

Figure 6:
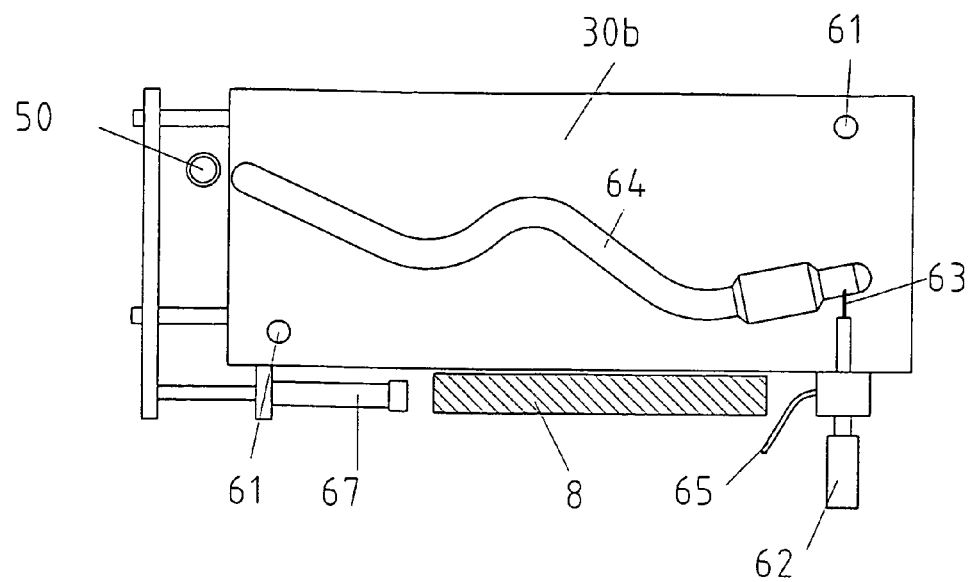
FIG. 6 illustrates a top view of the lower mold half in isolation.
Figure 6A:
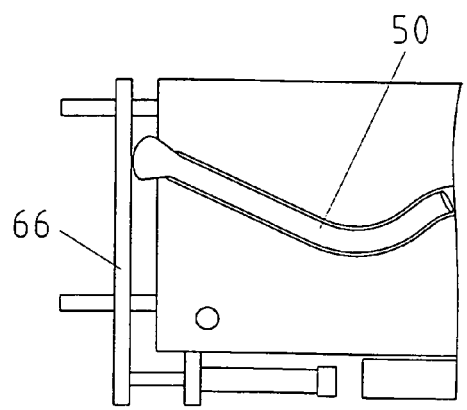
FIG. 6a illustrates the left part of the lower mold half according to FIG. 6, further showing an inserted tube.
Figure 7:
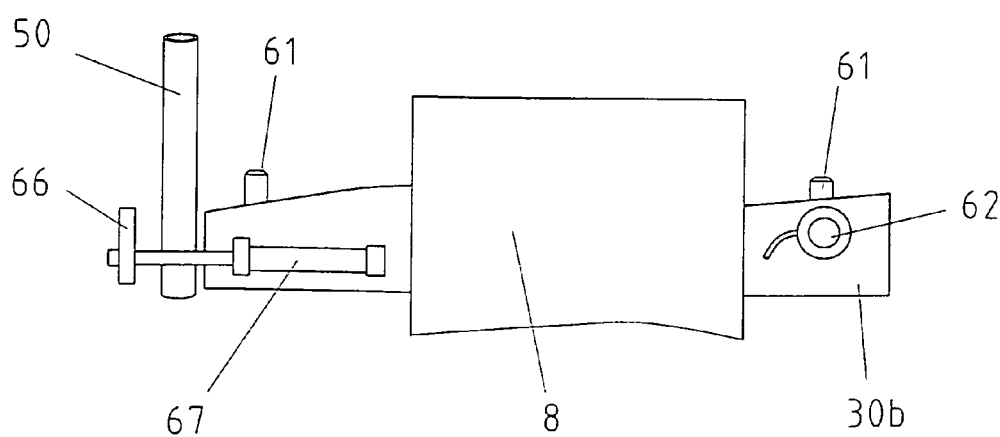
FIG. 7 illustrates a side view of the lower half of the mold of FIG. 6.

FIGS. 6, 6a, and 7 illustrate additional features of the lower mold half 30b. Specifically referring to FIG. 6, this mold half 30b comprises two adjusting pins 61 that correspond to bores or bushings in the upper mold half 30a (not shown). At its one end, the mold half 30b comprises a tube clamp 66 actuated by a working cylinder 67. The mold in FIG. 6 is opened, showing an exposed tube 50. FIG. 6a illustrates the tube clamp fixing and sealing the end of the tube 50. A working cylinder 62 attached to the other end of the mold half 30b can be used to move a hollow needle 63 into the cavity 64. When the mold is closed, the hollow needle 63 is inserted into the tube 50. Compressed air supplied via a line 65 is injected into the tube 50, causing it to blow up (inflate) and take the shape of the finished hollow body.

FIG. 7 shows the lower mold half 30b with the previously mentioned attached parts in a simplified side view.

The parts attached to the lower mold half 30b, illustrated in FIGS. 6, 6a, and 7, are to be understood as examples. They can be replaced by other apparatuses which are known from the state of the art.

Figure 8:
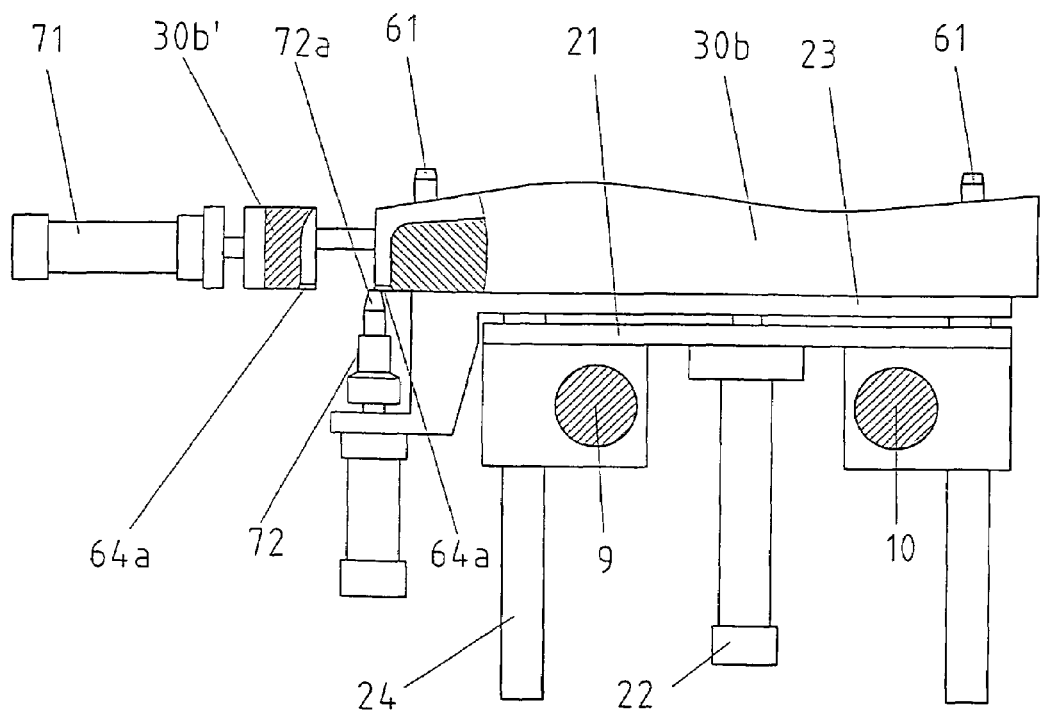
FIG. 8 illustrates a side view of another embodiment of the lower mold half in accordance with the present invention.
Figure 9:
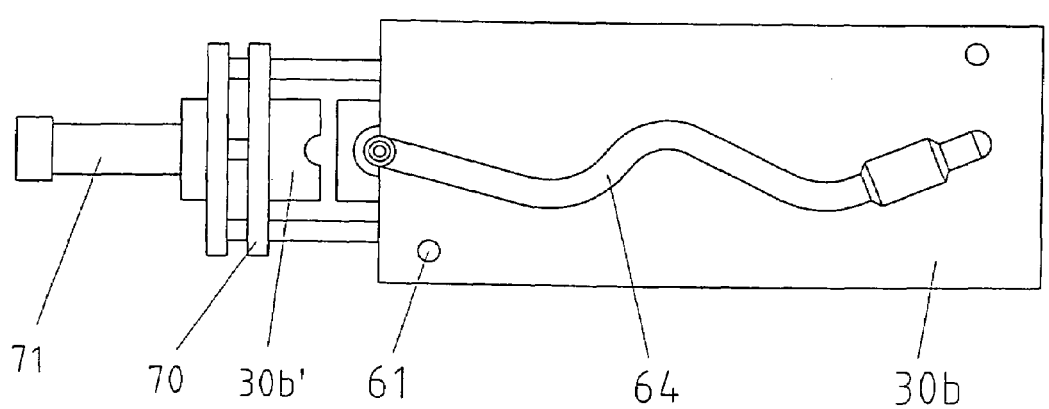
FIG. 9 illustrates a top view of the mold half of FIG. 8.

FIGS. 8 and 9 show another embodiment of the lower mold half 30b. In contrast to the FIGS. 6, 6a and 7, the outer vertical closing plate 8 has been omitted. As shown in FIG. 8, the lower blow mold half 30b is located on its closing plate 23, which can be raised and lowered by the lifting cylinder 22 and guided by the guide posts 24. The arrangement is situated on posts 9, 10 that support the outer vertical closing plate. The end on the left side of the cavity 64 is guided downward out of the mold half with a shape generally similar to that illustrated in FIG. 6. At this end, the mold half 30b is divided by a vertical plane extending through the cavity. The end section 30b' on the left side is mounted on a yoke 70. A hydraulic cylinder 71 is operable to displace the yoke 70 along guide rods from the illustrated opened position to a closed position. A conventional blow sleeve 72 is arranged beneath the downward-facing conical opening 64a of the cavity 64. When the mold is closed, the die 72a of the blowing sleeve 72 moves into the opening 64a or orifice of the cavity 64 until a seal between the blowing sleeve and the mold is formed, providing a seal around the tube and enabling the injection of air into the tube and the creation of the finished hollow body.

Figure 10:
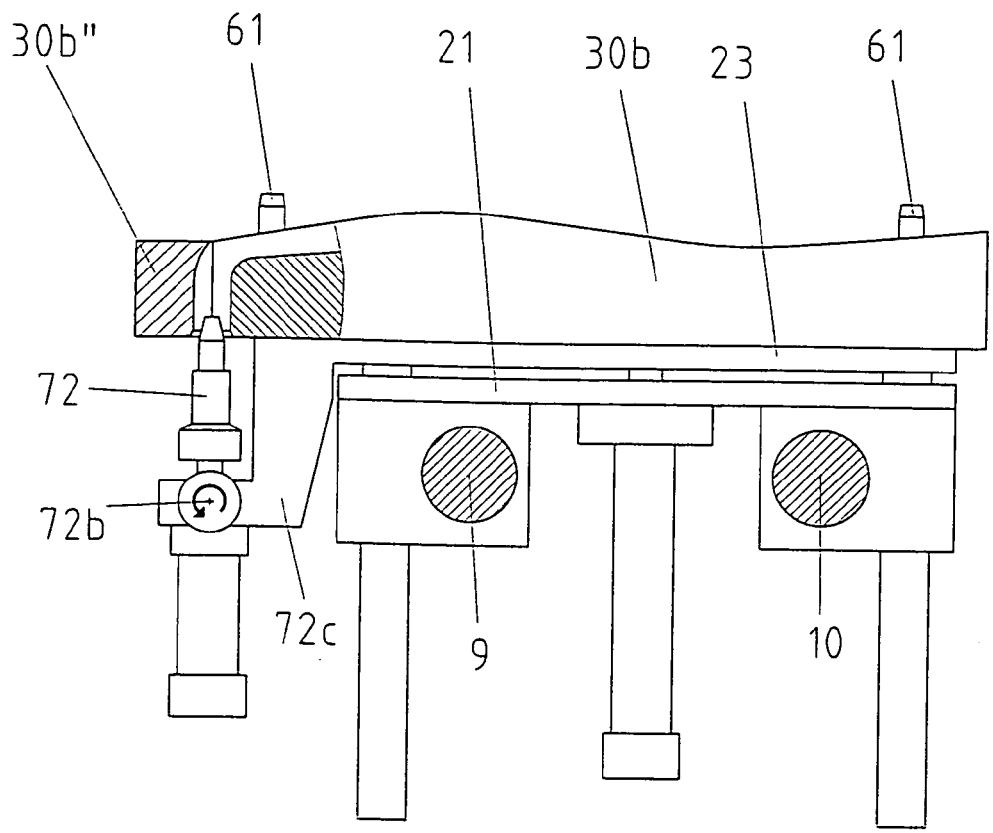
FIG. 10 illustrates a side view of a modified mold half in accordance with another embodiment of the present invention.
Figure 11:
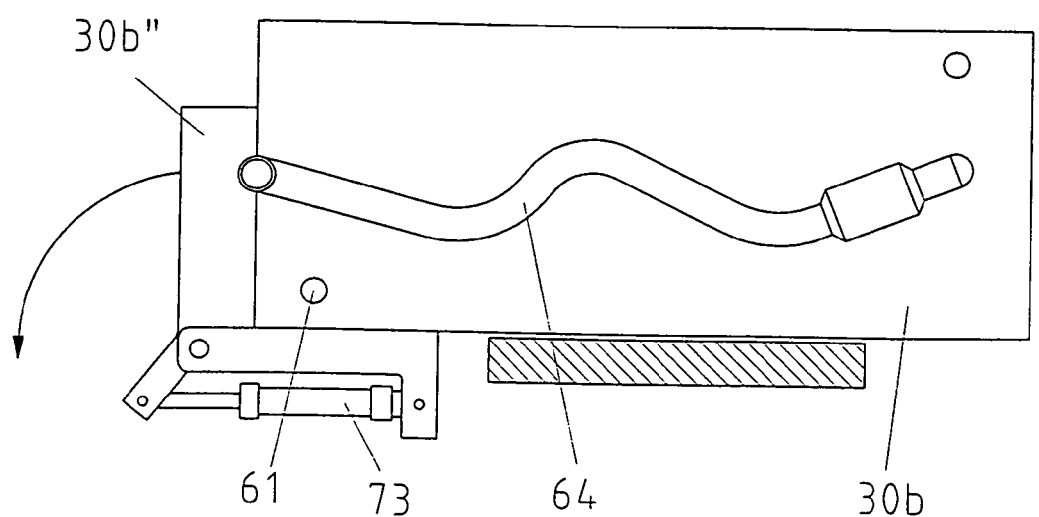
FIG. 11 illustrates a top view of the modified mold half of FIG. 10.

FIGS. 10 and 11 illustrate a modification in which the left side end 30b" can be swiveled downward (indicated by the arrow in FIG. 11) by a hydraulic cylinder 73. As in the case of FIG. 8, a blowing sleeve 72 is arranged beneath the mold half. The sleeve 72 rotates on its supporting arm 72a about an axis 72b (indicated by the arrow in FIG. 10). The hollow body is formed via air injection and the finished hollow body is cooled, and the blow mold is opened. Then, the part 30b" is swiveled downward (indicated by the arrow in FIG. 11) and the blowing sleeve is rotated about an axis 72b, while the die 72c remains inserted into the orifice of the cavity and entrains the solidified hollow body, which is then ejected from the mold without the need for any separate apparatuses for this purpose (e.g., a suction apparatus).

Figure 12:
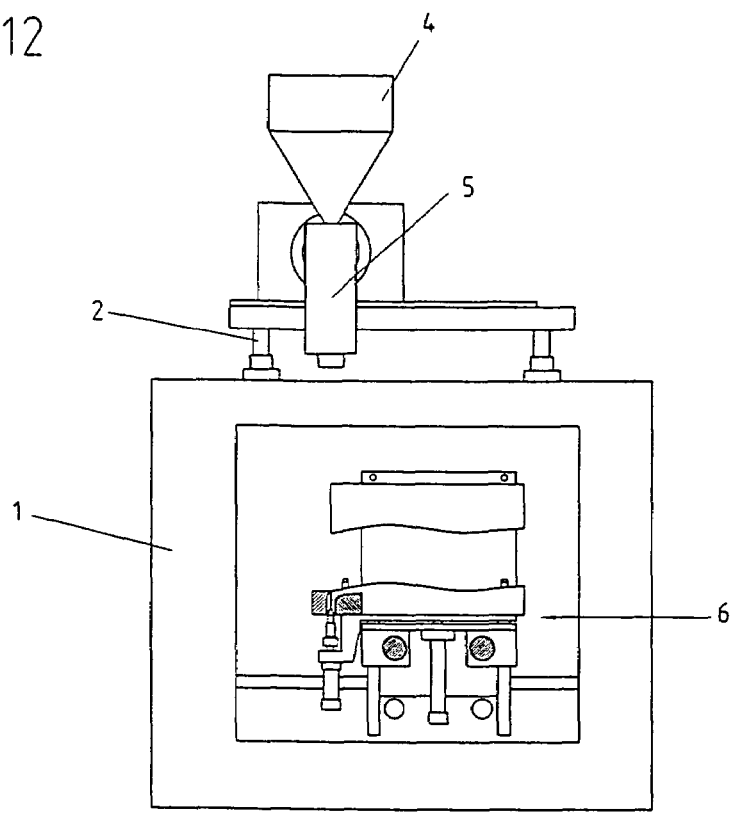
FIG. 12 illustrates a front side view of a blowing system with a closing unit.

FIG. 12 illustrates a front perspective view of a blowing system equipped with the blow mold illustrated in FIGS. 8 and 9.

Figure 13:
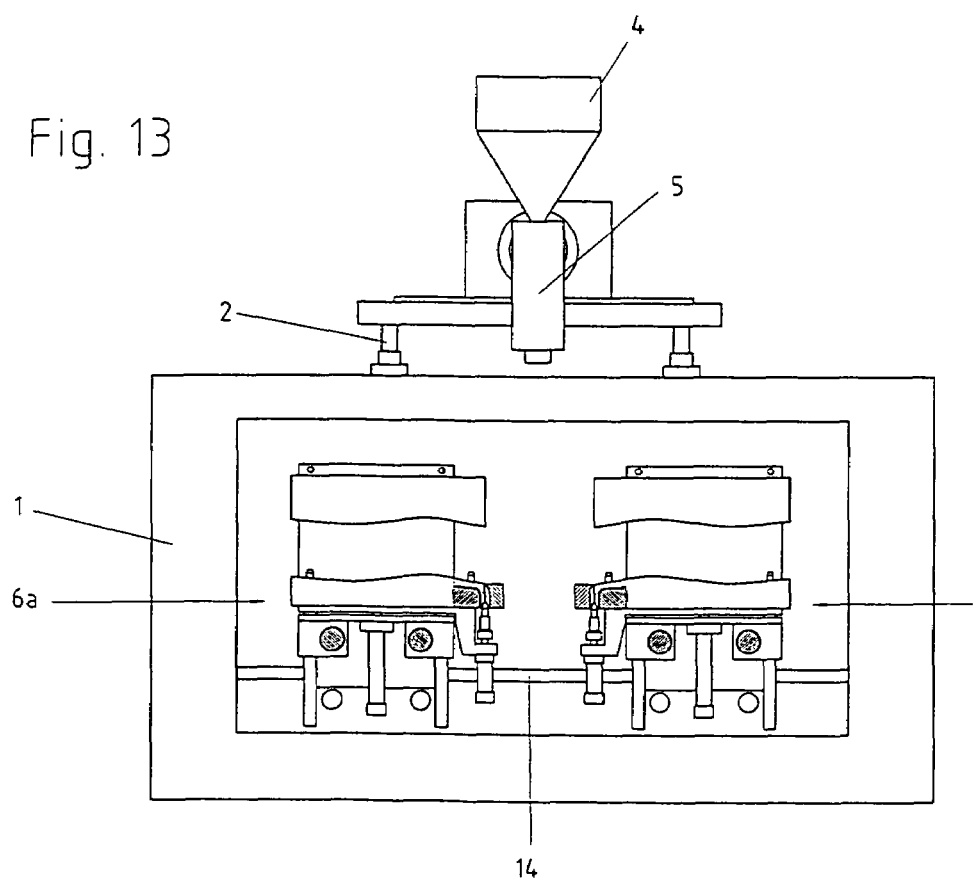
FIG. 13 illustrates a front side view of a blowing system including two closing units.

FIG. 13 shows the same machine, but equipped with a second closing unit 6a. The two closing units can have identical or different blow molds. The respective lower blow mold halves can be charged using the tube insertion robot described above (not shown in FIG. 13) such that one blow mold is charged while the tube previously inserted into the other blow mold is injected with air (blown out), or while the blown hollow body is cooling. Instead of the blow sleeves attached directly to the respective lower blow mold half as shown in FIGS. 8 and 9, the inserted tubes can also be blown out with blow sleeves such as reference numeral 15 in FIG. 2, which sleeves are fixed to the machine frame. They are then mounted on either side of the tube extrusion device 4. As indicated, the closing units 6, 6a can be moved independently along the same horizontal posts 13, 14 (FIG. 1) or can be displaced in tandem to enable their repositioning and alignment with their respective blowing sleeve.

The invention claimed is:

1. A system for forming a hollow body comprising:
a machine frame including a tube extrusion device and a die;
at least one closing unit comprising a first vertical closing plate and a second vertical closing plate displaceable in opposite directions such that the first and second vertical plates move towards and away from one another along horizontal posts mounted on a carriage operable to move the closing unit from a first position beneath the tube extrusion die to a second position;
an upper horizontal closing plate fastened in a cantilevered manner to an upper region of the first vertical closing plate, the upper horizontal closing plate supporting an upper mold half on its lower side;
a lower horizontal supporting plate fastened in a cantilevered manner to a lower region of the second vertical closing plate;
a lower horizontal closing plate situated on the upper side of the lower horizontal supporting plate;

a lower mold half situated on the upper side of the lower horizontal closing plate; and a hydraulic cylinder connected to the lower side of the lower horizontal supporting plate, wherein the hydraulic cylinder is capable of vertically displacing the lower horizontal closing plate;

wherein, when the vertical closing plates are moved toward each other, the upper horizontal closing plate and the lower horizontal supporting plate come into an interlocking engagement with the vertical closing plate.

2. The system for forming a hollow body according to claim 1, wherein the interlocking engagement between the upper horizontal closing plate and the second vertical closing plate, and between the lower horizontal supporting plate and the first vertical closing plate, is provided by guide pins and complementary guide bushings.

3. The system for forming a hollow body according to claim 1, wherein the lower horizontal closing plate is guided by guide posts and the hydraulic cylinder is positioned centrally beneath the lower horizontal closing plate.

4. The system for forming a hollow body according to claim 1 further comprising a tube insertion robot.

5. The system for forming a hollow body according to claim 4, wherein the tube insertion robot comprises squeeze pliers adapted to remove a tube having an upper tube end and a lower tube end from the die and to seal the upper tube end when removing the tube from the die.

6. The system for forming a hollow body according to claim 5, wherein the lower mold half comprises at least one clamping apparatus configured to seal one of the tube ends.

7. The system for forming a hollow body according to claim 1, further comprising a blowing apparatus arranged on one of the mold halves.

8. The system for forming a hollow body according to claim 7, wherein the blowing apparatus comprises a blowing air source connected to a hollow needle adapted to be inserted into a tube formed by the mold halves.

9. The system for forming a hollow body according to claim 7, wherein the die capable of forming a tube, and the blowing apparatus comprises a blowing sleeve configured to calibrate and shape one of the ends of the tube into an orifice of the finished hollow body.

10. The system for forming a hollow body according to claim 9, wherein the blowing sleeve is capable of lifting off the finished hollow body when the blow mold is open.

11. The system for forming a hollow body according to claim 1, wherein said at least one closing unit comprises two closing units adapted to move and be alternately positioned beneath the tube extrusion die.

12. The system for forming a hollow body according to claim 1, wherein the tube extrusion device is configured to be raised or lowered.

* * * * *